United States Patent [19]

Jelinek et al.

[11] 3,720,420
[45] March 13, 1973

[54] GASKET
[75] Inventors: Jerry G. Jelinek, Whittier; Edward Reinsch, Palos Verdes, both of Calif.
[73] Assignee: Parker-Hannifin Corporation, Cleveland, Ohio
[22] Filed: March 19, 1971
[21] Appl. No.: 126,192

[52] U.S. Cl. .................................. 277/180, 277/199
[51] Int. Cl. ........ F16j 15/00, F16j 15/08, F16j 15/10
[58] Field of Search ....... 277/180, 199, 189, 185, 195

[56] References Cited

UNITED STATES PATENTS

| 3,342,501 | 9/1967 | Meyer | 277/180 |
| 3,231,289 | 1/1966 | Carrell | 277/180 |
| 3,175,832 | 3/1965 | Carrell | 277/199 |
| 2,739,001 | 3/1956 | Chiles, Jr. | 277/180 |

*Primary Examiner*—Samuel B. Rothberg
*Attorney*—Diller, Brown, Ramik & Holt

[57] ABSTRACT

A gasket comprising a set of rigid cover sections overlying a set of rigid base sections, the sections carrying a resilient sealing element, the cover sections having endwise joints therebetween that are offset from endwise joints between the base sections and each cover section being attached to two base sections that it overlies so as to form a unitary gasket assembly.

9 Claims, 4 Drawing Figures

PATENTED MAR 13 1973 3,720,420

INVENTORS
JERRY G. JELINEK
& EDWARD REINSCH

ATTORNEYS

GASKET

BACKGROUND OF THE INVENTION

In composite gaskets comprising a combination of resilient and relatively rigid portions it is desirable to anchor the resilient portion to the rigid portion so that the gasket may be handled as one piece and so that it will be simple to install. This usually requires that the rigid portion be machined with a groove or undercut for lockingly receiving a part of the resilient member. Machining of such grooves is expensive. Also, for large size gaskets it is expedient to make the same in sections that can be joined together to make a unitary assembly. In prior arrangements, as for example U.S. Pats. Nos. 3,175,823 and 3,231,289, interlocking joints have been provided that are structurally complicated and hence costly to manufacture.

BRIEF SUMMARY OF THE INVENTION

The present invention provides a composite gasket of resilient and rigid materials in which the rigid portion is made up of a set of base sections and a set of cover sections. Each of the base sections contain a groove that has no undercuts and therefore is easy to machine or to mold therein. Also, each base section has a simple straight across end face that butts against a straight across end face of the adjoining base section.

The cover set comprises a plurality of sections of simple strip-like material of uniform thickness that overlies the base set to clamp a portion of a resilient sealing element in the groove of the base set, the groove being so formed that when the cover set is in position an interlocking grip is obtained on the sealing element to effectively retain the same.

In addition, the base and cover sets are so formed and so drilled with holes for clamping screws or rivets that the joints between the sections of the base set are staggered or offset from the joints between sections of the cover set, thereby providing a simple means of attaching the sections in a continuous gasekt and wherein a section in one set provides a rigid support for the joint between sections of the other set.

The sealing element can be either a continuous closed loop or a set of sections butted together endwise to form a loop. In the latter case the sections may be coextensive with the base sections to have their ends coincide with the ends of the base sections, or the sealing element sections may have their ends positioned between ends of the base sections.

DESCRIPTION

Figure 1:
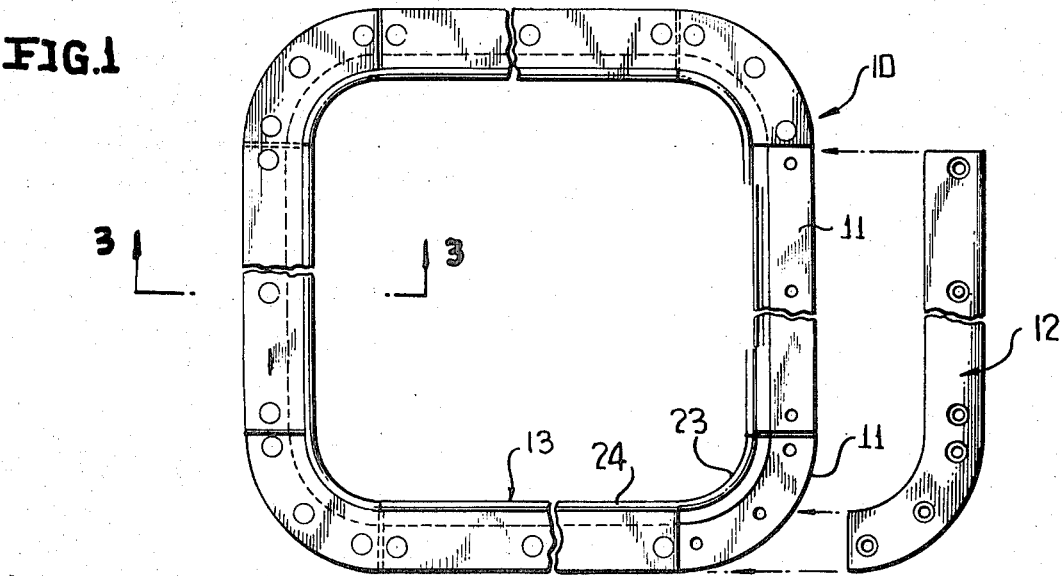
FIG. 1 is a plan view of the gasket with intermediate portions broken away and one of the cover sections displaced from the gasket.
Figure 2:
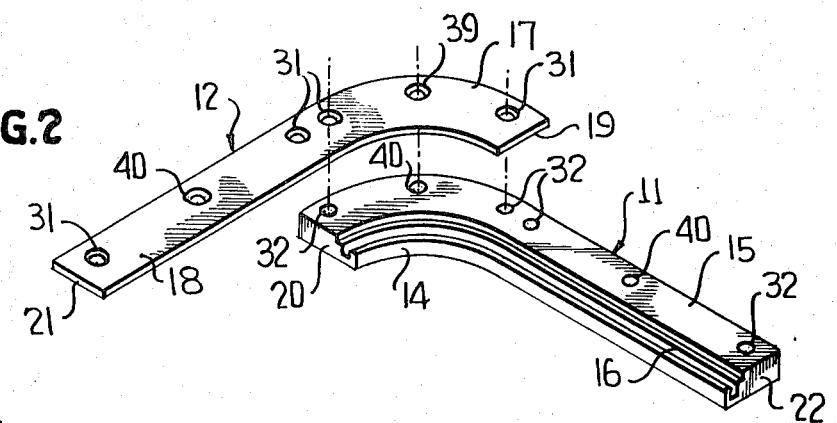
FIG. 2 is an exploded perspective view showing the overlapping relationship between the ends of the cover and base sections.

In the illustrated embodiment, a complete gasket 10 is formed of a set of base sections 11, a set of cover sections 12, and a set of resilient sealing element sections 13. The base and cover sections are of relatively rigid material such as metal or hard plastic and the sealing element sections may be of elastomeric or other readily deformable material. The illustrated gasket 10 is of a square outline and, depending upon the size thereof, may be formed of four sections each of the base, cover and sealing element.

Each of the base sections 11 includes a curved portion 14 and a straight portion 15. Along the inner edge, the upper surface of each section 11 is grooved as at 16 to define a recess of generally T-shaped cross section, as is best shown in FIG. 3.

Each cover section 12 also includes a curved portion 17 and a straight portion 18 so formed that when the cover curved portion 17 overlies the base curved portion 14 the end 19 of cover section 12 is intermediate the ends of base section 11 and the end 20 of base section 15 is intermediate the ends of cover section 12. Similarly, end 21 of cover section 12 is intermediate the ends of a base section 11 and end 22 of base section 11 is intermediate the ends of a cover section. Thus, when the cover sections 12 are in overlying relation to assembled base sections 11, the joints between the cover sections 12 are staggered with respect to the joints between the base sections 11.

When the curvature of curved portions 14 and 17 is relatively sharp, as illustrated, it is necessary that this curvature be molded into the corresponding portion of the sealing element, regardless of whether the sealing element is a one-piece continuous loop, a single strip, or a plurality of sections. In the form of sealing element illustrated in FIG. 1, there are sections 13 coextensive with base sections 11 and each sealing element section 13 has a curved portion 23 and a straight portion 24 corresponding to the curved portion 14 and the straight portion 15 of the respective base section 11.

Figure 3:
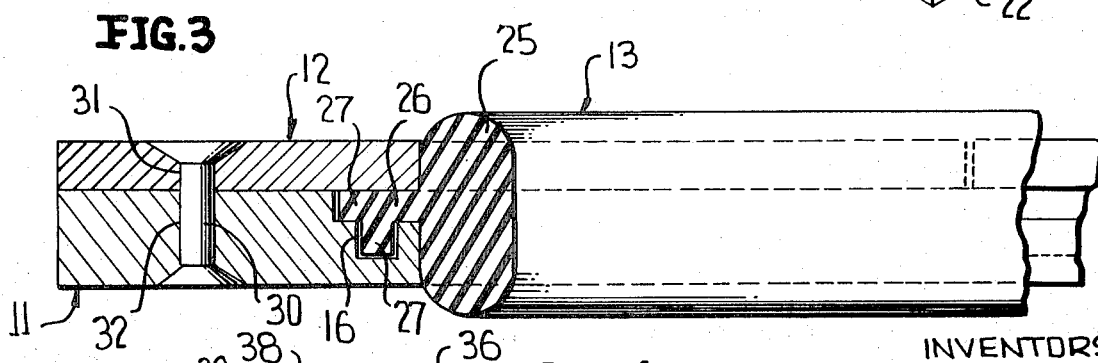
FIG. 3 is an enlarged fragmentary transverse sectional view taken along the line 3—3 of FIG. 1.

As shown in FIG. 3, each sealing element section 13 includes a sealing portion 25 of generally oval cross section and an integral mounting flange 26 of a T-shaped cross section that matches and fits into the T-shaped recess 16 formed when cover sections 12 are assembled to base sections 11.

The preferred relative proportions of recess 16 and flange 26 are such that there is clearance on the three sides of flange stem portion 27 and at the outer edge of the cross bar portion 27 while the thickness of the latter may be either the same as the height of the cross bar portion of T-shaped recess 16 or may be slightly greater so as to be lightly clamped between base sections 11 and cover 12.

In assembling gasket 10, the base sections 11 are arranged in the desired outline of the gasket 10 and the sealing elements 13 positioned therein. The cover sections 12 are applied and the entire gasket 10 is secured together as a unitary member by means of suitable fasteners, such as rivets 30, passed through aligned openings 31 in the cover sections 12 and openings 32 in the base sections 11. The sealing elements 13, base sections 11 and cover sections 12 are now joined to form a unitary composite gasket. With the parts thus assembled, sealing portion 25 of the sealing element 13 initially projects axially below the base sections 11 and above the cover sections 12.

Figure 4:
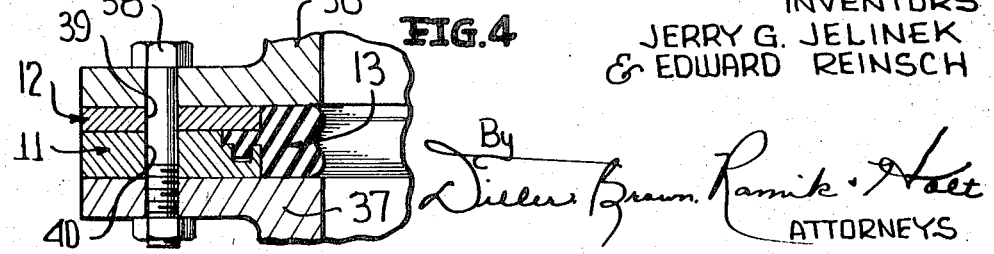
FIG. 4 is a sectional view showing a typical installation of the gasket.

When the gasket is installed between members 36 and 37 to be sealed, as shown in FIG. 4, the parts are secured together by bolts 38 passing through holes 39, 40 of the cover and base sections. Upon tightening of the bolts, portion 25 of the sealing element 13 will be deformed a predetermined extent and a seal between the sealing element 13 and the members 36 and 37 is achieved. Excessive deformation or extrusion of the sealing element 13 is prevented by rigid sections 11, 12 acting as a stop to limit the movement of the members 36, 37 toward each other.

Because the base and cover sections are separate pieces, recess 16 in the assembled gasket has an interlock configuration and yet is formed without an undercutting machining operation when the parts are cut from metal. Similarly, molding operations are simplified when the base part is a molded plastic. While the cover sections 12 may be formed of either metal or plastic, it is preferable that they be formed of metal inasmuch as they are flat and may be made from sheet or strip stock.

We claim:

1. A gasket comprising a set of relatively rigid base sections combined endwise with intermediate parting lines therebetween to define a predetermined outline, a set of relatively rigid cover sections combined endwise with intermediate parting lines therebetween and a deformable sealing element carried by said sets of sections, the parting lines between said cover sections being displaced from the parting lines between said base sections so that each cover section overlies two base sections, and each cover section being rigidly attached to the base sections that it overlies whereby all the sections are joined to form a unitary gasket assembly.

2. The gasket of claim 1 wherein said sealing element has a sealing portion laterally offset from said sections and projecting axially therebeyond for direct engagement with members to be sealed by said gasket.

3. The gasket of claim 2 wherein said sealing element has a mounting flange integrally connected to said sealing portion, said mounting flange being clamped between said cover and base sections.

4. The gasket of claim 3 wherein the base sections are formed to provide a channel to receive said mounting flange and the cover sections form one side of said channel.

5. The gasket of claim 4 wherein said mounting flange includes a portion projecting transversely therefrom and said channel includes a groove to receive said projecting portion to provide a mechanical interlock for retaining the sealing element on said sections.

6. The gasket of claim 5 wherein said mounting flange and said channel are of complementary T-shaped cross section.

7. The gasket of claim 1 wherein said sealing element is formed in sections.

8. The gasket of claim 7 wherein said sealing element sections are coextensive with said base sections.

9. The gasket of claim 1 wherein said base sections are in tight endwise engagement with each other and said cover sections are slightly spaced endwise of each other.

* * * * *